United States Patent [19]
Urai et al.

[11] Patent Number: 4,519,862
[45] Date of Patent: May 28, 1985

[54] METHOD OF MANUFACTURING CUSHION MATERIALS

[75] Inventors: Muneharu Urai; Tadafumi Abe; Youichirou Haraguchi; Koji Hayashi; Shigeki Kon, all of Tokyo, Japan

[73] Assignee: Tachikawa Spring Co., Tokyo, Japan

[21] Appl. No.: 538,939

[22] Filed: Oct. 4, 1983

Related U.S. Application Data

[63] Continuation of Ser. No. 321,638, Nov. 16, 1981, abandoned.

[51] Int. Cl.³ .................................................. B31F 1/00
[52] U.S. Cl. ..................................... 156/219; 156/221; 156/285; 156/311; 156/497; 156/498; 264/327
[58] Field of Search ............... 156/219, 221, 285, 497, 156/498, 209, 311; 264/327; 239/589

[56] References Cited

U.S. PATENT DOCUMENTS

| | | | |
|---|---|---|---|
| 1,754,708 | 4/1930 | Bevins | 239/589 |
| 2,874,418 | 2/1959 | Repici | 264/327 |
| 2,949,244 | 8/1960 | Philippe | 239/589 |
| 4,131,663 | 12/1978 | Lewicki, Jr. | 156/221 |
| 4,413,551 | 11/1983 | Jackson | 239/589 |

Primary Examiner—Jay H. Woo
Assistant Examiner—Timothy W. Heitbrink
Attorney, Agent, or Firm—Oldham, Oldham & Weber Co.

[57] ABSTRACT

A method of manufacturing a cushion material by welding under heat a first layer to an adjoining second layer at necessary portions of the latter by use of a welding member having a plurality of pressure applying projections. The material of the second layer is deformed and molten and flows at temperatures higher than those of the material of the first layer. In the method, the surface portions of the first layer not engaged by the welding member and lying closer to the welding member and/or the welding member itself are cooled by cooling gas thereby welding the first layer to the second layer without giving rise to any appreciable thermal change on the surface of the first layer except the portions engaged by the welding member.

6 Claims, 18 Drawing Figures

METHOD OF MANUFACTURING CUSHION MATERIALS

This is a continuation application of Ser. No. 321,638, filed Nov. 16, 1981 now abandoned.

BACKGROUND OF THE INVENTION

This invention relates to a method of manufacturing cushion materials used for covering the surfaces of seats and other internal members of automobiles and houses, articles of furniture, trunks, clogs and the like, each of such cushion materials being in the form of a sandwich structure including a vinyl coated fabric or like surface material (a first layer), a core or filler pad of conventional foamed polyurethane (a second layer) and a backing material (a third layer), welded together by, for example, high frequency welding.

When, in the production of the cushion material of the three-layer structure by high frequency welding, the melting point of conventional foamed polyurethane used as the filler pad providing the second layer is higher than that of the vinyl coated fabric providing the first layer, the vinyl coated fabric providing the first or surface material layer may be excessively fused or molten during welding of the three layers by application of heat, resulting frequently in such defects that the surface layer bears an undesirable luster or becomes in the form of keloids or is broken off the second layer.

Conventional or usual foamed polyurethane (which will be referred to hereinafter merely as conventional polyurethane) has generally such a property that, when compressed by a pressure applying member while being heated at about 130° C., it starts to deform and is finally fused or molten at about 180° C. Vinyl coated fabric starts to deform at about 110° C. and is finally fused or molten to flow at about 140° C.

In view of the defects pointed out above, low-melting polyurethane or the like has been employed in place of the conventional polyurethane. However, the low-melting polyurethane is twice or more as expensive as the conventional polyurethane, and its physical properties are extremely lower than those of the conventional polyurethane. Therefore, a method has been proposed which comprises introducing a welding material such as powdery nylon to weld areas of conventional polyurethane, and heating the conventional polyurethane at about 110° C. at which the conventional polyurethane would not become molten although the powdery nylon is molten, thereby welding the polyurethane core to the surface material layer by the molten powdery nylon while causing desire deformation of the core of conventional polyurethane. This method has, however, been also defective in view of the material cost of the welding material and the additional step of introduction of the welding material.

For a better understanding of the present invention, this prior art method will be described with reference to FIGS. 1 to 3.

FIG. 1 is a schematic sectional view of a cushion material of three-layer structure including a vinyl coated fabric or like surface material (a first layer) 1, a core or filler pad of conventional polyurethane (a second layer) 2, and a backing material (a third layer) 3. The cushion material includes weld areas 4 welded by pressure applied by a welding member. The prior art method of manufacturing such a cushion material will be described with reference to FIG. 2.

FIG. 2 shows one form of prior art welding equipment used for welding the first, second and third layers. Referring to FIG. 2, a welding member 5 fixedly mounted on a lower plate 9 of a high frequency welding apparatus is formed with a plurality of pressure applying projections 5a the number of which is equal to the number of weld areas 4 of the cushion material. The surface material 1, the conventional polyurethane 2 and the backing material 3 are placed in the above order on the pressure applying projections 5a of the welding member 5, and then, a sheet of insulating paper 6 is placed on the backing material 3. Subsequently, an upper plate 8 of the high frequency welding apparatus having a heating unit 7 fixedly mounted on the lower surface thereof is moved downward to compress the weld areas 4 of the sandwich of the surface material 1, conventional polyurethane 2 and backing material 3 between the heating unit 7 and the pressure appplying projections 5a while heating the weld areas 4 by the heating unit 7, and, at the same time, high frequency heating current is supplied to weld together the three layers at the weld areas 4 shown in FIG. 1.

FIG. 3 is an enlarged detail view of part of the three layers welded together by one of the pressure applying projections 5a of the welding member 5 shown in FIG. 2. In this case, a vinyl coated fabric is used as the surface material 1. It will be seen in FIG. 3 that the portion of the surface material 1 engaged by the corners of the upper end of the pressure applying projection 5a is molten and depends downward to form a deformed surface layer portion 1a which looks like a keloid, or as a result of refoaming or excessive melting, the corresponding portion of the backing of the vinyl coated fabric 1 may be exposed, or an undesirable luster impairing the otherwise beautiful appearance of the entire surface of the surface material 1 may appear on that surface portion of the surface material 1. Also, the portion of the weld area 4 welded by the pressure applying projection 5a may flow out, resulting in a lowered mechanical strength of the weld. Such a cushion material is extremely degraded in quality to such an extent that it is no more marketable.

STATEMENT OF OBJECTS

It is therefore a primary object of the present invention to provide a novel and improved method of manufacturing a cushion material which obviates the defects of the prior art method pointed out above. The method according to the present invention is featured by the fact that, during welding of the three layers by a welding member, the portions of the surface of the first layer closer to the welding member than the remaining portions but not in engagement with the welding member and/or the welding member itself are cooled by cooling fluid so as to weld the first layer to the second layer without causing any appreciable thermal change on the surface portions of the first layer except the portions engaged by the welding member. The method according to the present invention eliminates the necessity for introduction of the aforementioned welding material such as powdery nylon, simplifies the manufacturing process and can reduce the rate of producing rejects, so that the cushion material can be furnished at a low cost.

BRIEF DESCRIPTION OF DRAWINGS

The above and other objects, features and advantages of the present invention will become more apparent from the following description of preferred embodiments thereof taken in conjunction with the accompanying drawings, in which.

DETAILED DESCRIPTION

Preferred embodiments of the method according to the present invention will now be described in detail with reference to the drawings.

Figure 3:
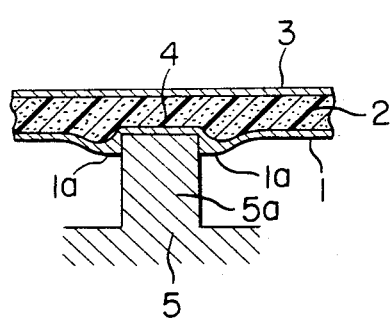
FIG. 3 is an enlarged detail view showing one of the pressure applying projections and the associated portion of the cushion material shown in FIG. 2.

The occurrence of the deformed surface portion 1a shown in FIG. 3 is prevented according to the present invention by cooling the portion of the surface material 1 engaged by the corners of the upper end of the pressure applying projection 5a of the welding member 5, so that the portion of the vinyl coated fabric (the surface material 1) remote from the portion tending to produce the deformed portion 1a may not be rendered molten or softened to be extruded or flow out toward the pressure applying projection 5a.

Some examples of the method will now be described.

Figure 4:
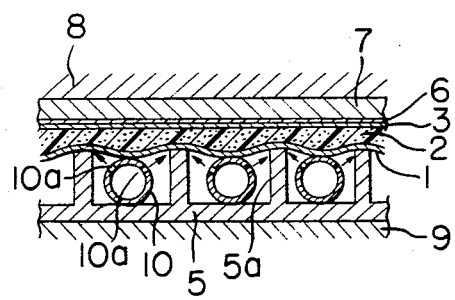
FIG. 4 is a schematic sectional view of a welding and cooling apparatus employed in an embodiment of the method according to the present invention.

FIG. 4 illustrates one of the examples or an embodiment of the method according to the present invention. Referring to FIG. 4, a cooling pipe 10 is disposed between the adjacent pressure applying projections 5a of the welding member 5, and suitably cooled gas, which may be air, is supplied into the cooling pipes 10 from an external source. A suitable number of cooling gas jet nozzles, holes or nozzle means 10a are bored in each of the cooling pipes 10, and cooling air is directed from the nozzles 10a in the directions of the arrows, that is, toward the upper end of the pressure applying projections 5a and the associated portions of the surface material 1 so as to prevent formation of the deformed surfacce portion 1a shown in FIG. 3. As described above, the cooling pipe 10 is preferably disposed in the space between the adjacent ones of the pressure applying projections 5a. When, however, the distance between the adjacent pressure applying projections 5a is too short to permit insertion of the cooling pipe 10 therebetween, cooling air may be directly supplied into such a narrow space for cooling the associated portion of the surface material 1, although not shown. This method is also effective for preventing melting of the surface material 1 by cooling the pressure applying projection 5a itself as described later with reference to FIG. 7.

Figure 5:
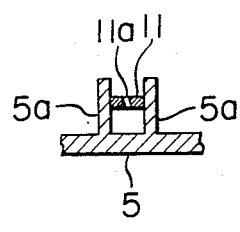
FIG. 5 is a schematic sectional view of a cooling arrangement employed as a partial modification of the welding apparatus shown in FIG. 4.

FIG. 5 illustrates similarly that the distance between the adjacent pressure applying projections 5a is too narrow to permit insertion of the cooling pipe 10 therebetween. Referring to FIG. 5, a cover 11 having a plurality of cooling air jet nozzles 11a extends between the pressure applying projections 5a to define a space into which cooling air is supplied, and cooling air is directed from the nozzles 11a toward the surface material 1 so as to prevent melting of the surface material 1.

Figure 6:
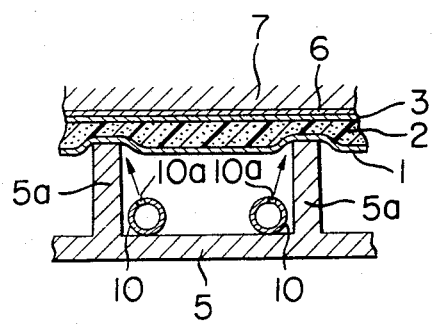
FIG. 6 is a schematic sectional view of a welding and cooling apparatus which is a modification of the apparatus shown in FIG. 4.

FIG. 6 illustrates that the distance between the adjacent pressure applying projections 5a is larger than that in FIG. 4, and two cooling pipes 10 are disposed between the pressure applying projections 5a. The surface material 1 is cooled by cooling air directed from cooling air jet nozzles 10a of the cooling pipes 10 as in the embodiment described with reference to FIG. 4.

Figure 7:
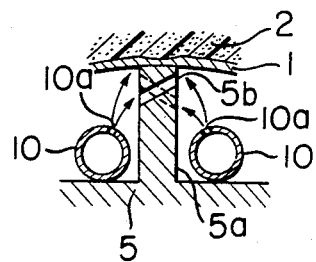
FIGS. 7, 8 and 9 are schematic sectional views showing other manners of cooling in other embodiments of the method according to the present invention.

FIG. 7 illustrates that two air passages 5b are provided in an upper portion of the pressure applying projection 5a. One of the air passages 5b permits passing of cooling air directed from the cooling air jet nozzles 10a of the cooling pipe 10 disposed on one side of the pressure applying projection 5a, while the other air passage 5b permits passing of cooling air directed from the cooling air jet nozzleas 10a of the cooling pipe 10 disposed on the other side of the pressure applying projection 5a, so that these air passages 5b serve to cool the opposite portions of the surface material 1 and also to cool the upper portion of the pressure applying projection 5a, thereby reducing the temperature of the pressure applying projection 5a itself and preventing overheating of the surface material 1. In this embodiment, the air passages 5b are arranged to alternately extend obliquely upward from the opposite sides, that is, they are disposed in a crossing relation.

Figure 14:
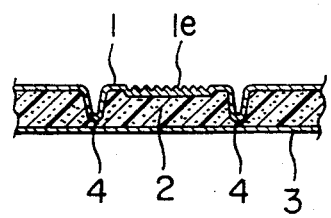
FIG. 14 is a schematic sectional view of a cushion material in which an embossed pattern is formed on a surface material in the step of welding in another embodiment of the method according to the present invention.

One of the purposes of cooling the pressure applying projections 5a of the welding member 5 in the present invention is to prevent an excessive rise of the temperature at the surface portions of the surface material 1 which are not engaged by the pressure applying projections 5a, to prevent extra melting of the surface material 1 at the weld areas 4 at which the surface material 1 is engaged by the pressure applying projections 5a, and to promote cooling after the embossing treatment described later with reference to FIG. 14. Further, when the distance between some of the pressure applying projections 5a is too narrow to permit insertion of the cooling pipe 10 therebetween, although not shown in FIG. 7, cooling air supplied from the cooling pipe 10 disposed between the next adjacent pair of the pressure applying projections 5a may be passed through one of the air passages 5b so as to cool both of the surface material 1 and the pressure applying projection 5a from that side.

Figure 8:
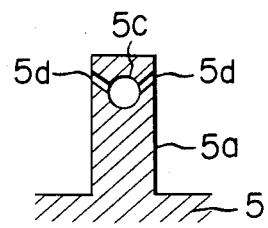

FIG. 8 illustrates that an air passage 5c corresponding to the cooling pipe 10 and a plurality of cooling air jet ports 5d branched from the air passage 5c are provided in the pressure applying projection 5a so as to cool the pressure applying projection 5a and also to direct cooling air towrd the surface material 1 from the cooling air jet ports 5d. The purpose of provision of such means is similar to that explained with reference to FIG. 7.

Figure 9:
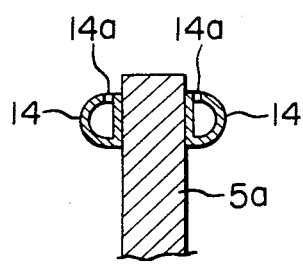

FIG. 9 illustrates that hollow tubular members 14 defining cooling pipes having a plurality of cooling air jet nozzles 14a are fixed directly to the opposite sides of an upper portion of the pressure applying projection 5a. It is apparent that the functional or meritorious effect of the embodiment shown in FIG. 9 is similar to that of the embodiment shown in FIG. 8. The hollow tubular members 14 may have any one of sectional shapes including a circular shape, a semicircular shape and a rectangular or square shape.

Figure 10:
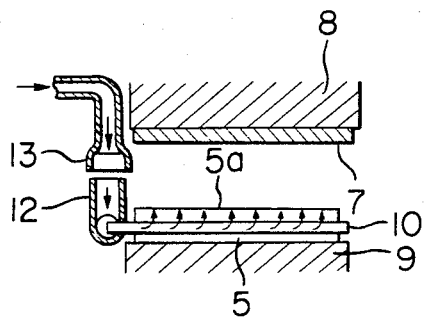
FIG. 10 is a schematic sectional view showing a manner of supplying and shutting off cooling gas in another embodiment of the method according to the present invention.

FIG. 10 illustrates an embodiment applied to a high frequency welding apparatus including a shuttle type table provided with, for example, two left-hand welding members 5 and two right-hand welding members 5 making a total of four welding members 5, although only one of them is shown. In FIG. 10, the surface material 1, the filler pad 2 of conventional polyurethane and the backing material 3 stacked on the pressure applying projections 5a of the welding member 5 are not illustrated to avoid confusion. The cooling pipes 10 disposed between the pressure applying projections 5 are connected to a common main cooling air conduit 12 which is automatically jointed to an external air supply conduit 13 to supply cooling air to the individual cooling pipes 10 when the lower plate 9 of the apparatus is urged upward toward the upper plate 8. Downward movement of the lower plate 9 away from the upper plate 8 releases the joint between the main cooling air conduit 12 and the external air supply conduit 13. In this latter case, an automatic valve mounted in the external air supply conduit 13 is automatically closed. This automatic valve is automatically opened in response to the upward movement of the lower plate 9. Cooling air is continuously supplied throughout the steps of applying pressure to the materials being heated, supplying current for high frequency welding, cooling down of the welded materials and releasing of the applied pressure.

Although not illustrated hereinbefore, the mode of supplying cooling air differs depending on the type of high frequency welding apparatus. The mode of supplying cooling air to the cooling pipe 10 in various high frequency welding apparatus will now be described.

In the high frequency welding apparatus of the type in which there is only one welding member 5, and the lower plate 9 or the upper plate 8 is arranged to move upward or downward, the welding member 5 is also arranged to make upward or downward movement. In this type of the high frequency welding apparatus, the main cooling conduit 12 and the external air supply conduit 13 may be kept in the coupled condition. Also, in the case of the high frequency welding apparatus of the shuttle type in which there is only one welding member 5, and this member 5 is adapted to slide laterally together with the lower plate 9, the main cooling air conduit 12 and the external air supply conduit 13 may be kept in the jointed condition, and the external air supply conduit 13 may be in the form of a flexible hose which can supply external air continuously while moving together with the welding member 5.

In the case of the high frequency welding apparatus of the turntable type, a plurality of branch pipes extending from the center of rotation of the turntable may be connected to the individual welding members 5. Alternatively, pipe joints may be inserted into the welding members 5 from the outer periphery of the turntable to supply cooling air during the step of welding. In any one of the modes above described, cooling air is automatically supplied during only the process where cooling is required.

Figure 11:
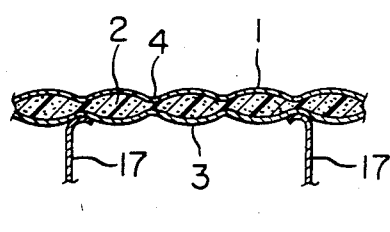
FIG. 11 is a schematic sectional view of a cushion material to which strips of suspension cloth are simultaneously welded during the step of welding in still another embodiment of the method according to the present invention.

FIG. 11 illustrates a cushion material in which separate strips of suspension cloth 17 are welded to its lower surface simultaneously with the welding of weld areas 4 while cooling the same according to the method of the present invention. These strips of suspension cloth 17 are used for fixing the cushion material to, for example, underlying coil springs.

Figure 12:
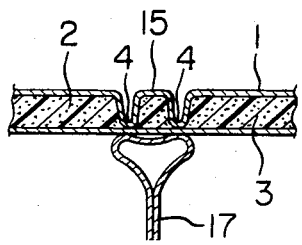
FIG. 12 is a schematic sectional view of a cushion material in which a button-shaped portion is formed and to which strips of suspension cloth are simultaneously welded in the step of welding in yet another embodiment of the method according to the present invention.

FIG. 12 illustrates a cushion material in which a button-shaped portion 15 is formed on the upper surface of the surface material 1 during the step of welding, and strips of suspension cloth 17 are also welded, at the same time, to the lower surface of the backing material 3 while cooling the weld areas 4 according to the method of the present invention.

Figure 13A:
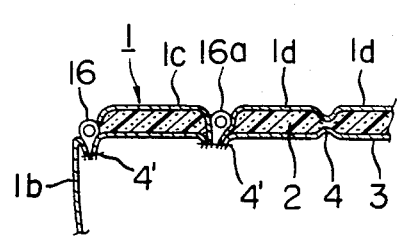
FIG. 13A is a schematic sectional view of a cushion material in which two kinds of surface materials are welded to the combination of conventional polyurethane and a backing material in another embodiment of the method according to the present invention.

FIG. 13A illustrates a cushion material in which two kinds of surface materials 1, that is, a vinyl coated fabric having a side portion 1b, a welt 16 and a peripheral portion 1c and a woven fabric having a welt 16a and a main top portion 1d are welded to a filler pad 2 of conventional polyurethane and a backing material 3 while cooling the weld areas 4 and are shaped into the form of a cushion, at the same time, according to the method of the present invention. The terms "side portion 1b", "peripheral portion 1c" and "main top portion 1d" are used to designate the side portion of the sitting area of the cushion, the peripheral portion of the upper surface of the sitting area of the cushion, and the upper central portion of the sitting area defined by the peripheral portions 1c, respectively.

The structure shown in FIG. 13A is commonly applied to a seat cushion in the form in which its main top portion 1d is formed of a woven fabric and its peripheral portion 1c is formed of a vinyl coated fabric. In many cases, a vinyl material is also commonly used to provide the welts 16a and 16b.

Figure 13B:
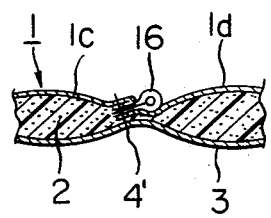
FIG. 13B is a schematic sectional view of the cushion material in which the conventional polyurethane and the backing material shown in FIG. 13A are united into an integral continuous layer.

In the cushion material shown in FIG. 13A, the combination of the filler pad 2 of conventional polyurethane and the backing material 3 on one side of the welt 16a and the combination of those on the other side of the welt 16a are separately prepared and welded together. In a modification shown in FIG. 13B, the cushion material includes a continuous filler pad 2 of foamed polyurethane and a continuous backing material 3. Such a cushion material is made by a method similar to that used for manufacturing the cushion material shown in FIG. 13A.

Figure 13C:
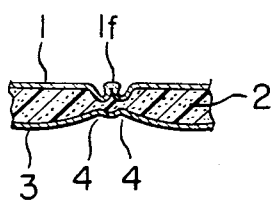
FIG. 13C is a schematic sectional view of the cushion material in which a welt is formed simultaneously in the step of welding of the three layers.

In another modification shown in FIG. 13C, a welt 1f is formed on the surface material 1 at the time of welding of the three layers 1, 2 and 3. The method of manufacturing such a cushion material is also similar to that used for manufacturing the cushion material shown in FIG. 13B.

Figure 13D:
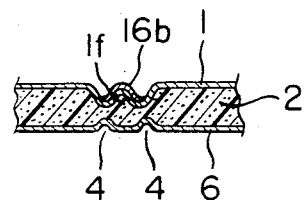
FIG. 13D is a schematic sectional view of the cushion material in which a welt of a color different from that of the surface material is formed or superposed on the welt shown in FIG. 13C.

In a cushion material shown in FIG. 13D, a welt 16b of a color different from that of the surface material 1 is welded onto the welt 1f in the cushion material shown in FIG. 13C, so that a more beautiful appearance can be exhibited by the contrast between the different colors. The surface material 1 is similarly cooled to enhance the effect of the present invention.

Although not shown, the lower plate of the welding apparatus is provided with a plurality of projections each having a groove at its upper end for forming the welt 16b, and the upper plate is provided with a plurality of projections for applying pressure to the weld areas 4. In a preferred method, a strip of material of a color different from that of the surface material 1 is put on the upper surface of the surface material 1 having the welts 1f thereon, and heat is applied to weld the welts 16b onto the welts 1f. In another method, the above strip is previously placed in each of the grooves of the lower plate of the welding apparatus, and heat is applied to weld the welts 16b onto the welts 1f in one step. In one of other methods, the strips providing the welts 16b are bonded to the welts 1f, and pressure is then applied to superpose the welts 16b on the welts 1f. The material of the welt 16b of the color different from that of the surface material 1 may be different from that of the surface layer 1.

FIG. 14 illustrates a cushion material in which an embossed pattern 1e or any other designed attractive pattern is formed by a member having an embossing pattern or designed pattern on the surface material 1 at the time of welding of the three layers at weld areas 4. In this case, the pattern is formed on the surface layer 1 or conventional polyurethane layer 2 only. Although not shown, a pattern similar to the stitch pattern provided by a sewing machine may be formed on the weld areas 4 by the pressure applying projections 5a of the welding member 5. The temperature of the welding member 5 is still high immediately after the formation of the embossed pattern. When the molded cushion material is separated from the pressure applying projections 5a of the welding member 5 while the vinyl resin does not still cure, the embossed pattern will not be distinctly defined. To avoid the above defect, it is necessary to lower the temperature of the pressure applying projections 5a of the member 5 after the step of embossing, as described already with reference to FIG. 7.

Figure 15:
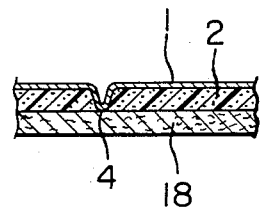
FIG. 15 is a schematic sectional view of a cushion material in which the third layer is replaced by a hardboard in still another embodiment of the method according to the present invention.

FIG. 15 shows a cushion material in which a hardboard 18 is used in place of the backing material 3, and the filler pad 2 of conventional polyurethane has a thickness less than hitherto. Such a cushion material is also manufactured according to the method of the present invention and finds its useful application to, for example, the door pads of automobiles.

Figure 1:
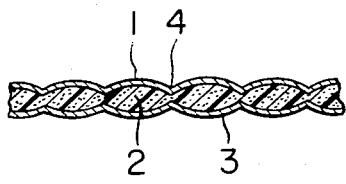
FIG. 1 is a schematic sectional view of a cushion mateiral.
Figure 2:
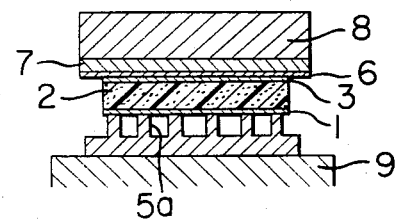
FIG. 2 is a schematic vertical sectional view of a prior art high frequency welding apparatus.

In the welding apparatus shown in FIG. 2, the heating unit 7 is provided for the purpose of application of heat. A material having a large dielectric constant such as ferrite generates a quantity of heat and a temperature higher than those of the welded materials subjected to high frequency heating by high frequency current. Thus, for example, a sheet of a mixture of powdery ferrite and silicon resin can be employed in place of the heating unit 7 so as to eliminate the heating unit 7.

In the embodiments of the present invention described above, air has been referred to as an example of cooling gas. However, it is apparent that any one of other suitable cooling gases (or liquids) may be used in lieu of air.

Further, although the heating by high frequency current has been referred to in the above description, the method of heating is in no way limited to the high frequency heating, and the source of heat in the apparatus of the type comprising the upper and lower plates may be any one of high temperature vapors, high temperature liquids, gas flames and the like and may also be ultrasonic waves and the like.

The material of the surface layer or first layer among the three layers preferably employed in the present invention is in no way limited to the vinyl coated fabric and may, for example, be any one of other synthetic resin fabrics, woven cloth and non-woven cloth, provided that its deforming, melting and flowing temperatures under the influence of heat are lower than those of the second layer of, for example, conventional polyurethane or thermally fusion-bonded fabric under the influence of heat.

The method according to the present invention is in no way limited to the manufacture of cushion materials and finds wide applications to internal decorative articles such as door pads, carpets and roofings for automobiles, as well as, to furniture and miscellaneous goods.

According to the method of the present invention, inexpensive conventional polyurethane can be used as the material of the filler pad, and any welding material such as powdery nylon employed heretofore is unnecessary. Therefore, the number of manufacturing steps can be reduced to reduce the manufacturing costs. Further, the application of cooling during the process of welding obviates the possibility of excessive melting and flow-out of the surface material at the weld areas, so that the weld areas can be accurately shaped in addition to the formation of desired decorative portions such as welts. The surface of the cushion material thus manufactured can be satisfactorily finished, and the rate of production of rejects is very low. The present invention can therefore greatly improve the quality of the cushion materials and can also reduce the manufacturing costs.

What is claimed is:

1. A method of manufacturing a cushion material by welding under heat a first layer to an adjoining second layer at necessary portions of the latter by use of a welding member having a plurality of spaced pressure applying projections engaging said first layer, said second layer being such that the deforming, melting and flowing temperatures of the material thereof under the influence of heat being higher than those of the material of said first layer, cooling pipes 10 with jet nozzles therein being disposed in the space formed between adjacent pressure applying projections and the surface of said first layer, the method comprising cooling the surface portions of said first layer in the vicinity of but not engaged by said welding member and lying close to said welding member by directing streams of cooling fluid toward portions of the surface of said first layer in the vicinity of the pressure applying projections of said welding member, thereby cooling such portions of said first layer but permitting thermal change on the surface of said first layer to the portions engaged by said welding member.

2. A method of manufacturing a cushion material as claimed in claim 1, wherein a plurality of cooling pipes each having a plurality of cooling gas jet nozzles are disposed on said welding member, and at least one cooling gas passage extends in an oblique relation through each of the engaging ends of the pressure applying projections of said welding member, the cooling gas from said cooling gas jet nozzles being directed toward said air passages and toward the engaging ends of said pressure applying projections of said welding member, thereby cooling said welding member and cooling the surface of said first layer, simultaneously.

3. A method of manufacturing a cushion material as claimed in claim 1, wherein a cooling gas passage extends, in parallel to the weld areas, through each of the engaging ends of the pressure applying projections of said welding member, and/or at least one cooling pipe is fixed to each of the pressure applying projections of said welding member, cooling gas being supplied to said cooling pipes and/or said cooling gas passages to cool said welding member, or a plurality of cooling gas jet nozzles being branched from each of said cooling gas passages and/or each of said cooling pipes to direct cooling gas therefrom toward said first layer to cool the surface of said first layer.

4. A method of manufacturing a cushion material as claimed in claim 2 or 3, wherein a main cooling gas conduit, to which all of said cooling pipes for cooling said welding member and the surface of said first layer are connected, is automatically jointed to an external cooling gas supply conduit during the step of cooling, said main cooling gas conduit being automatically separated from the latter after the step of cooling, and an automatic valve in said external cooling gas supply conduit is automatically closed after the step of cooling.

5. An apparatus for manufacturing a cushion material by welding under heat a first layer to an adjoining second layer at necessary portions of the latter by means comprising a welding member having a plurality of spaced pressure applying projections for engaging said first layer, said second layer being such that the deforming, melting and flowing temperatures of the material thereof under the influence of heat are higher than those of the material of said first layer, cooling pipes 10 with jet nozzles therein being disposed in space formed between adjacent pressure applying projections and the surface of said first layer, said jet nozzles being directed toward portions of the surface of said first layer in the vicinity of the pressure applying projections of said welding member for primarily cooling such portions of said first layer only without giving rise to any appreciable thermal change on the surface areas of said first layer engaged by said welding member;

a main cooling gas conduit to which all of said cooling pipes for cooling said welding member and the surface of said first layer are connected, an external cooling gas supply conduit, said main cooling conduit automatically joining to said external cooling gas supply conduit during the step of cooling, said main cooling gas conduit being automatically separated from said external cooling gas supply conduit after the step of cooling, and an automatic valve in said external cooling gas supply conduit adapted to be automatically closed after the step of cooling.

6. An apparatus for manufacturing a cushion material by welding under heat a first layer (1) to an adjoining second layer (2) at necessary portions of the latter by means comprising a welding member (5) having a plurality of spaced parallel pressure applying projections (5a) for engaging said first layer, said second layer being such that the deforming, melting and flowing temperatures of the material thereof under the influence of heat are higher than those of the material of said first layer, cooling pipes (10) with jet nozzles (10a) therein being disposed in the space formed between adjacent pressure applying projections and the surface of said first layer, said cooling pipes (10) being at least substantially parallel to said projections, a plurality of aligned cooling jet nozzles being present in each cooling pipe and forming a line substantially parallel to said projections, said jet nozzles being directed toward portions of the surface of said first layer in the vicinity of the pressure applying projections of said welding member for cooling exposed portions of said first layer to prevent any appreciable thermal change or melting of said first layer except to the portions thereof directly engaged by said welding member.

* * * * *